(12) United States Patent
Rabipour

(10) Patent No.: US 7,916,686 B2
(45) Date of Patent: Mar. 29, 2011

(54) METHOD AND COMMUNICATION NETWORK COMPONENTS FOR MANAGING MEDIA SIGNAL QUALITY

(75) Inventor: Rafi Rabipour, Cote St. Luc (CA)

(73) Assignee: Genband US LLC, Plano, TX (US)

( * ) Notice: Subject to any disclaimer, the term of this patent is extended or adjusted under 35 U.S.C. 154(b) by 1131 days.

(21) Appl. No.: 11/360,432

(22) Filed: Feb. 24, 2006

(65) Prior Publication Data
US 2007/0201485 A1    Aug. 30, 2007

(51) Int. Cl.
*H04W 4/00*  (2009.01)

(52) U.S. Cl. ..................................... 370/328

(58) Field of Classification Search ............... 398/43, 398/77, 78; 370/310, 315, 316, 319, 320, 370/464, 465
See application file for complete search history.

(56) References Cited

U.S. PATENT DOCUMENTS

| | | | |
|---|---|---|---|
| 2003/0063343 A1* | 4/2003 | Pheiffer et al. | 359/110 |
| 2003/0086405 A1* | 5/2003 | Silva et al. | 370/342 |
| 2003/0163554 A1* | 8/2003 | Sendrowicz | 709/220 |
| 2005/0259627 A1* | 11/2005 | Song et al. | 370/342 |
| 2006/0062225 A1* | 3/2006 | Li | 370/396 |
| 2006/0106600 A1* | 5/2006 | Bessette | 704/223 |
| 2006/0153081 A1* | 7/2006 | Simonsson et al. | 370/238 |
| 2006/0215596 A1* | 9/2006 | Krishnaswamy et al. | 370/328 |

* cited by examiner

*Primary Examiner* — Anh-Vu Ly
(74) *Attorney, Agent, or Firm* — Jenkins, Wilson, Taylor & Hunt, P.A.

(57) ABSTRACT

A media signal quality manager for controlling one or more parameters of a network node through which passes a media signal. The audio signal quality manager has an input for receiving information conveying a characteristic of the media signal and a processor that generates performance control information in response to the characteristic of the media signal. The performance control information can be conveyed to the network node for allowing the network node to adjust at least one parameter of the media signal that can influence the quality of the media signal as perceived by a user.

40 Claims, 3 Drawing Sheets

METHOD AND COMMUNICATION NETWORK COMPONENTS FOR MANAGING MEDIA SIGNAL QUALITY

FIELD OF THE INVENTION

The invention relates to communication networks that handle media signals for delivery to a user, such as audio and/or video information, and more particularly to methods and network components to manage the network performance to achieve a desired media quality target.

BACKGROUND OF THE INVENTION

The management of the quality of a wireless/wireline media signal, such as voice calls typically requires the selection of a suitable point of trade-off in a multi-dimensional optimization space. The most common practice governing the capacity/quality trade-off in a packet network, wireless or wireline, is the configuration parameter that regulates the rate of audio data loss, such as the rate of frame erasures (in wireless) or rate of packet loss (wireline). This is best exemplified in wireless networks by the Radio Network Controller (RNC) parameter that controls the average frame-erasure rate in a Code Division Multiple Access (spread spectrum) type access network. This parameter, referred to as the Block Error Rate (BLER), drives the power control algorithm that controls the wireless access network. It is usually a constant whose value is chosen by the operator of a wireless network in accordance with their selected capacity target and voice quality objective.

The traditional method of selecting a static BLER target is not adequate when the network operator wants to deliver a certain audio quality level across different call configurations. This is due to the fact that with the increased commonality of mobile-to-mobile calls as well as land-to-mobile calls traversing packet networks, the overall rate of frame erasures or lost packets is no longer determined by a single air-interface. Rather, the overall packet loss rate is the sum of the frame-erasure rates of two air-interfaces (for mobile-to-mobile calls) and the packet loss rate over the backhaul network.

The same or similar inadequacies are noted in connection with other factors that affect the audio quality, or more generally the quality of a media signal that is being carried through a communications service and delivered to the user. For example, the delay induced in the media signal as it propagates through a communications network is one of the factors that affects the media signal quality and that is not adequately managed with current technologies.

Against this background, it clearly appears that a need exists in the industry to provide improved methods and network devices to better manage the audio quality during voice calls.

SUMMARY OF THE INVENTION

According to a first broad aspect the invention provides a media signal quality manager for controlling one or more parameters of a network node through which passes a media signal. The audio signal quality manager has an input for receiving information conveying a characteristic of the media signal and a processor that generates performance control information in response to the characteristic of the media signal. The performance control information can be conveyed to the network node for allowing the network node to adjust at least one parameter of the media signal that can influence the quality of the media signal as perceived by a user.

According to a second broad aspect, the invention provides a network node for passing data traffic conveying audio information associated with a voice call. The voice call is established over a communication path in the network including two or more network links, the network node being located at a junction between an inbound link and an outbound link of the communication path. The expressions "inbound" and "outbound" refer to the direction of data flow to and from the node. Data arrives to the node via the inbound link and leaves the node via the outbound link. The network node includes an audio quality manager. The audio quality manager is responsive to information conveying a characteristic of the voice call to generate performance control information, for use in adjusting at least one parameter of the voice call that can influence the audio quality of the voice call.

In this specification the expressions, upstream, downstream, incoming or outgoing or inbound or outbound are all used with reference to the flow of audio data during a voice call over a communication path in the network.

In a non-limiting example of implementation of the invention one or more of the network nodes that are part of the communication path over which the voice call is established receive from upstream and downstream nodes information on a characteristic of the voice call that influences the audio quality of the call. For example, the characteristic that is reported may be the rate of audio data loss, such as the rate of frame erasure or packet loss. Another example of voice call characteristic that is reported and that influences the audio quality is the delay introduced in the audio data traveling over the communication path. On the basis of the reported voice call characteristic, the node can attempt to set performance characteristics for some or all of the downstream segments of the communication path such as to avoid or at least limit further audio quality degradation. For example, the node can set the performance characteristics for the audio data such that fewer packets or frames will be lost or giving priority to the audio data to avoid further increasing in a significant way the delay.

In another non-limiting example of implementation the characteristic of the voice call that is being reported and which influences the audio quality is the topology of the communication path over which the voice call is established. The topology of the communication path is indicative of the audio quality degradation that may be expected. For example, if the topology indicates that one or more air interfaces are present, where audio data loss is likely to arise, the node may enforce more stringent performance goals to avoid further audio quality degradation.

In a third broad aspect the invention provides a method for managing service quality in a communications network having a plurality of nodes. The method includes setting up a voice call over a communication path in the network spanning a plurality of nodes. The method also includes adjusting a network performance parameter affecting an audio quality of the voice call over a portion of the communication path downstream a certain node on the basis of a characteristic affecting an audio quality of the voice call over a portion of the communication path upstream the certain node.

In a fourth broad aspect the invention also provides a method for controlling the audio quality of a voice call including audio data transmitted over an air interface. The method includes comparing information indicative of an audio quality of the voice call to a threshold and causing an increase in a relative power of transmission of the audio data over the air interface if the comparison indicates that the audio quality is below the threshold.

In a fifth broad aspect the invention also provides a method for controlling the audio quality of a voice call including audio data transmitted over an air interface. The method includes receiving information indicative of the number of air interfaces included in a communication path over which the voice call is transported. If the voice call includes a single air interface the method includes transmitting the audio data at a first relative power level. If the voice call includes more than one air interface the method includes transmitting the audio data at a relative power level higher than the first relative power level.

In a sixth broad aspect the invention provides a method for managing call quality in a network node passing data traffic conveying audio information associated with a voice call. The voice call is established over a communication path in the network and including two or more network links, the network node being located at a junction between an inbound link and an outbound link of the communication path. The method including receiving at an input the data traffic from the inbound link and generating performance control information on the basis of at least one characteristic of the voice call. The method further includes adjusting at least one parameter of the voice call at least in part on the basis of the performance control information to reduce degradation of audio quality as audio information is transmitted over the outbound link.

BRIEF DESCRIPTION OF THE DRAWINGS

A detailed description of examples of implementation of the present invention is provided hereinbelow with reference to the following drawings, in which.

Figure 1:
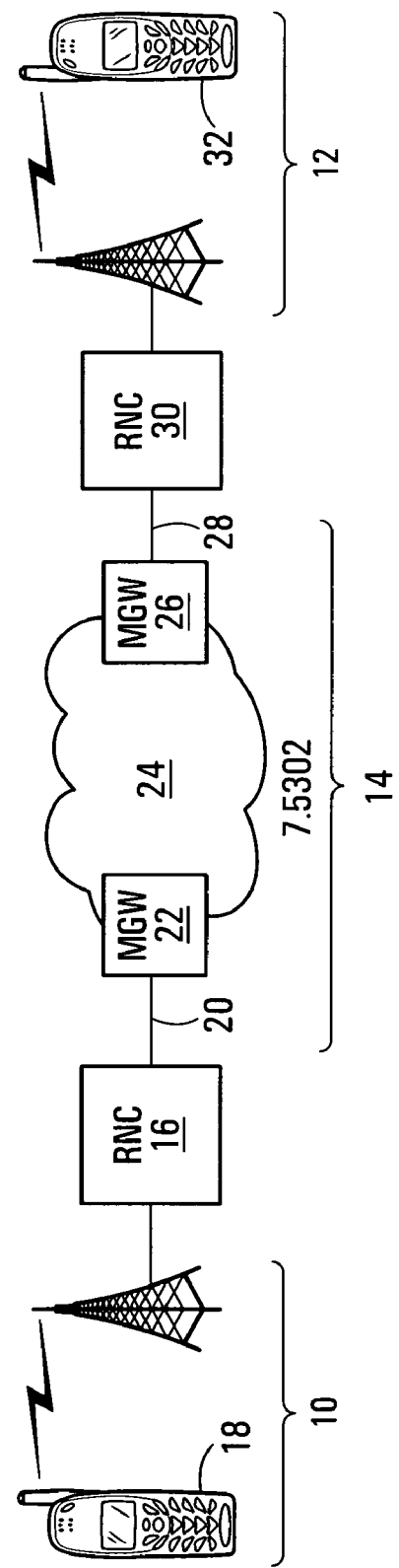
FIG. 1 is a high level block diagram of a portion of a network showing a communication path over which a voice call is established.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 shows a portion of a communications network in which a communication path has been established to carry a voice call. The voice call is a mobile-to-mobile call, including two air interfaces 10 and 12 and a section 14 including one or more wireline based segments. The network infrastructure that supports the communication path includes a Radio Network Controller (RNC) 16 that maintains a radio communication with the first mobile 18. The RNC 16 exchanges data with the mobile 18 via a spread-spectrum transmission but other communication techniques can also be used without departing from the spirit of the invention. The RNC 16 sends audio data over a link 20 that transports it to a Media Gateway (MGW) 22 which is located at the edge of a packet sub-network 24. Thus, the MGW 22 constitutes the entry point for the audio information in the packet sub network 24. The audio data is retrieved from the packet sub-network 24 by a MGW 26 that can be identical to the MGW 22. Note that the MGW 22 can be different from the MGW 26 in terms of architecture or functionality, without departing from the spirit of the invention. Finally, the audio data is conveyed over a link 28 to RNC 30. The RNC 30 may be identical to RNC 16 or different from it in terms of architecture or functionalities and it is provided to convey the audio data over the air interface 12 to the second mobile 32. Again, the transmission over the air interface 12 can be done by using a spread-spectrum transmission but other technologies can also be used without departing from the spirit of the invention.

Figure 3:
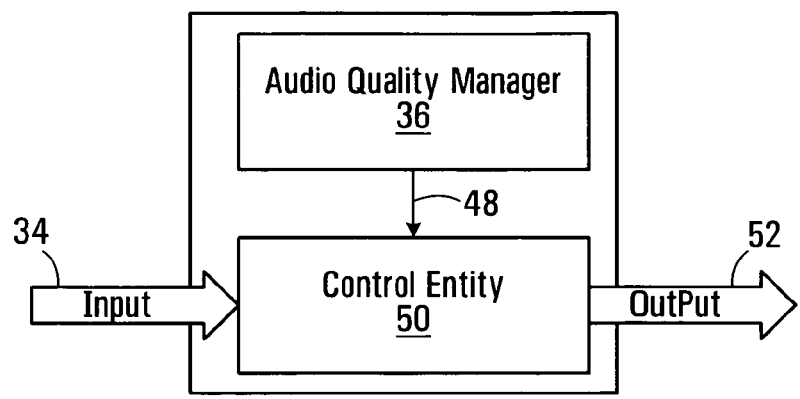
FIG. 3 is a more detailed block diagram of a network node shown in FIGS. 1 and 2.

FIG. 3 is generic detailed block diagram that applies to anyone of the network nodes 16, 22, 26 and 30. The node includes an input 34 that receives all data entering the node. The input 34 also carries any control or signaling information that may be exchanged between the node and other network entities. In a specific example, the input 34 would encompass the media signals passing through the node and any control or signaling information directed to the node. By "media signal" is meant a signal that includes voice information, video information or a combination of both that is intended for reception, i.e. hearing or viewing by a user. The example discussed below will be discussed in connection with a media signal consisting of voice information, such as in the context of a voice call. It is to be expressly noted, however, that the present invention is not limited to voice applications since it is also applicable to video signals as well.

The node includes an audio quality manager 36 that generates performance control information. The performance control information can be used to adjust one or more than one parameter of the voice call to alter the audio quality. In a specific example of implementation, the performance control information adjusts one or more parameters of the voice call to avoid or reduce a degradation of the audio quality as the audio data is transmitted downstream of the node 22.

Figure 5:
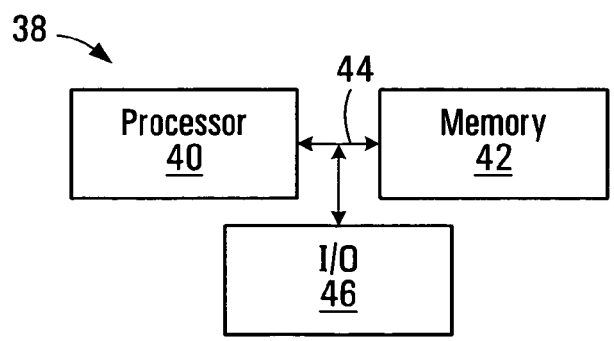
FIG. 5 is a block diagram of the computing platform that can be used to implement the audio quality manager shown in FIG. 3.

FIG. 5 is a more detailed block diagram of the audio quality manager 36. The audio quality manager is built on a computing platform 38 including a processor 40 and a memory 42 that communicate with one another over a data bus 44. An Input/Output (I/O) interface 46 also communicates with the data bus 44 and provides a mechanism allowing receiving external signals and also transmitting internal signals to external devices. The memory 42 can be implemented in many different ways, and in most cases it would include a volatile portion and a non-volatile portion to hold data in a permanent or semi-permanent manner. Specifically, the non-volatile portion includes a program code that is executed by the processor 40 and that provides various functions such as receiving information conveying a characteristic of the voice call and the processing of that information such as to produce the performance control information.

The block diagram of FIG. 5 illustrates the computing platform 38 as being separate from the remainder of the hardware of the node. This illustration is for convenience only. In most implementations of the node, the audio quality manager is likely to take the form of software running on the processor that performs other computing tasks in the node.

The audio quality manager 36 receives information about one or more characteristics of the voice call on the basis of which the performance control information is computed. The information about one or more characteristics can be generated by an external source, can be generated internally or can be a combination of an external source and information internally produced. As to the specific characteristic that is being reported, several possibilities exist. A first possibility is to report the amount of audio data that is being lost. Since a loss of audio data is likely to impact the audio quality then this characteristic is relevant for the computation of the performance control information. Another possibility is to report the delay induced in the audio data stream. Again, excessive delay impacts audio quality. These two possibilities allow computing the performance control information in a dynamic fashion, in other words the performance control information may change in the course of a call, if the reported characteristic(s) changes.

Another characteristic of the voice call that can be reported but that is likely to remain fixed during the course of the call is the call topology. Since the type of infrastructure used to carry the audio data has an impact on the audio quality, information on the call topology can be used as an indicator of the quality degradation that may be expected over the communication path. For instance, it is known that an air interface, such as the air interface 10 in FIG. 1 can degrade the audio quality by causing a loss of audio data. As a consequence, the number of air interfaces in the communication path, such as the path shown in FIG. 1 from mobile 18 to mobile 32 is likely to influence the audio quality. For example, the communication path shown in FIG. 2, that is a mobile-to landline call, can be reasonably expected to lose less audio data than the communication path shown in FIG. 1.

As discussed briefly earlier the audio quality manager 36 generates performance control information which can be used to adjust one or more than one parameter of the voice call to influence the audio quality. The performance control information is output at 48 from the audio quality manager 36 to a control entity 50. The control entity 50 will change network parameters in response to the performance control information such as to avoid or at least reduce further audio quality degradation downstream the node. Similarly, the control entity 50 may decide to increase audio degradation in favor of increased capacity, should the overall performance improve.

Finally, the node includes an output that releases the data entering the input 34, including any control or signaling information. In a specific example of implementation, the output 52 releases information about one or more characteristics of the voice call that impact the audio quality such as nodes of the network that are downstream the node can process the information to adapt the network to a particular audio quality target.

Specific examples of the operation of the node will be described below:

Example 1

With reference to FIGS. 1 and 3, consider specifically the RNC 16. An audio call is set-up over the communication path shown in FIG. 1, namely a mobile-to-mobile call. The RNC 16 receives at input 34 audio data from the mobile 18 transported over the air interface 10. The RNC 16 determines the rate of audio data loss which can be expressed as the Frame Error Rate (FER). The techniques to make this determination are known in the art and will not be described in detail here. The rate of audio data loss is indicative of the audio quality degradation occurring over the air interface 10 and that information is input in the audio quality manager 36. The software that implements the functionality of the audio quality manager 36 compares the rate of audio data loss occurring at the air interface 10 with a threshold. Assume for the sake of this example that the threshold is exceeded. This implies that the audio quality manager 36 will have to take proactive action to set performance control parameters for the audio transmission downstream the RNC 16 such as to reduce further audio quality degradation. One way to limit a further reduction of the audio quality degradation is to limit audio data packet loss over the link 20. Specifically, the audio quality manager 36 issues performance control information at 48 directed to the control entity 50. Assume that the control entity 50 can provide different degrees of priority to data packets transported over the link 20, where a higher priority entails a smaller risk of data loss. Therefore, in this case, the control entity 50 will assign a higher priority to the data packets that carry the audio information. In other words, if the RNC 16 carries a number of voice calls, that particular call will be given priority over other calls by assigning a higher priority level to the audio data packets.

In one specific example, one audio data loss threshold is provided. If the threshold is exceeded then the priority of the packets over link 20 is raised one level. A more sophisticated approach is to provide several thresholds, each associated with increasing levels of audio quality degradation. As the audio quality degradation exceeds more and more thresholds the priority of the packets is increased by more and more levels.

The audio quality manager 36 will also send, via the control entity 50 information on the audio data loss occurring at the air interface 10. The information may be formatted or packaged in many different ways without departing from the spirit of the invention. The information can be transmitted through the output 52 via in-band signaling (in the audio data), or out of band signaling, both techniques being well known to those skilled in the art.

It is also possible to send via the output information identifying that a corrective action was taken to avoid or at least limit further audio quality degradation.

Example 2

Figure 2:
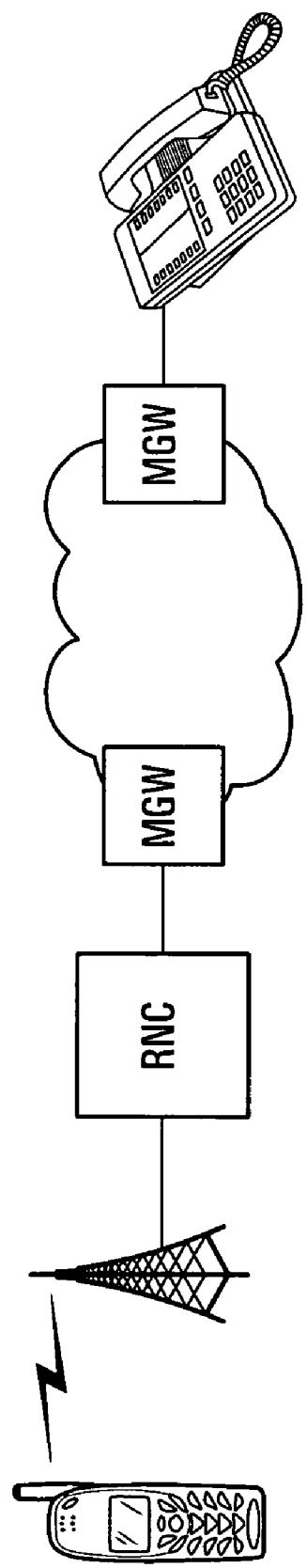
FIG. 2 is similar to FIG. 1 and illustrates a communication path having a different topology.

With reference to FIGS. 1 and 2, consider now the operation of the MGW 22, as a continuation of example 1. The MGW 22 receives at the input 34 the audio data of the voice call and also the information about the characteristic of the voice call that impacts the audio quality. In this case the characteristic is the rate of audio data loss at the air interface 10. The MGW 22 will also determine, in a well known fashion, audio data loss that may have occurred over the link 20. In principle, this data loss should be limited since the RNC 16 has raised the priority level of the data packets carrying the audio data, however, some packet loss may still be occurring. The audio quality manager 36 will combine the audio data loss over the air interface 10 and the link 20 such as to provide a compound audio data loss value representing the total audio data loss upstream the MGW 22. Note that the compounding at this stage is a preferred option. In the case when the transport over the link 20 is very reliable, hence the likelihood of packet loss is very small, the audio quality manger 36 may operate only on the basis of the audio data loss occurring at the air interface 10.

As in the previous case, the audio quality manager 36 will determine if corrective action is required by comparing the audio data loss to a threshold and issue performance control information at 48. The control entity 50 will then make the necessary settings such that the transport over the sub-network 24 will not induce an unnecessarily high audio quality reduction.

If the sub-network 24 is a wireline packet network generally, audio quality degradation can come from two sources. The first is from loss of packets. The second is delay of packets. In both cases the problems can be mitigated by raising the priority level of the packets that convey the audio data. In this fashion, the packets will be delivered more reliably, hence controlling the audio quality degradation occurring in the sub-network 24. As discussed earlier, the level at which the priority of the audio data packets can be raised can be correlated to the degree of audio quality impairment occurring over the segments of the communication path upstream the MGW 22.

The output 52 thus releases the audio data in the form of packets that are assigned a higher priority level and will be treated in this way by any intermediate node within the sub-network 24. Note that there may be many such intermediate nodes in the sub-network 24. The output also contains the information about the audio data loss that has occurred upstream of the MGW 22, depending on the specific option chosen. For instance, if no consideration is given to the packet loss over the link 20 the information reported at the output 52 will only convey the audio data loss occurring at the air interface 10, otherwise a compounded audio data loss is reported.

One possibility is to insert the audio data loss information to be reported in the audio data via in-band signaling. Another option is to send it separately from the audio data.

Another possibility is to also send, in addition to the audio data loss report, information about the proactive action taken by the MGW 22 to positively show that measures are being taken to avoid loss of audio quality.

Example 3

With reference to FIGS. 1 and 2, consider now the operation of the MGW 26, as a continuation of example 2. The MGW 26 operates in a very similar manner than MGW 22. There are, however, some elements of distinction. Since MGW 26 receives the audio data that has been transported via a packet sub-network that may be of significant extent, audio data loss is likely to occur at least to some degree. As per the measures taken by the MGW 22 to reduce this loss, and also reduce the possible delay, it is possible that the audio data loss and the data delay as seen at the MGW 26 is minimal but in all likelihood, some will exist.

Therefore, the MGW 26 will take into account the audio data loss determined to arise within the packet sub-network 24 and the audio data loss arising over the air interface 10. In a specific example, both values can be added together to provide a total audio data loss value for the entire segment of the communication path upstream the MGW 26. An even more sophisticated approach is to take into account the delay observed by the MGW 26. A simple manner to factor in the delay is to increase the audio data loss by a predetermined factor that will result in an artificial audio data loss value, higher than the real audio data loss value but that creates an audio quality degradation that is similar to the audio quality degradation resulting from the real audio data loss combined with the delay.

Another option to reduce delay is to give the channel at MGW 26 carrying the voice call a higher scheduling priority.

The remainder of the operations performed by the MGW 26 is very similar to the operations performed by the MGW 22. In the instance where the transport over the link 28 is very reliable, hence little or no data loss is likely to occur, then little corrective action is required.

Example 4

With reference to FIGS. 1 and 3, consider now the operation of the RNC 30 as a continuation of example 3. The RNC 30 receives at its input 34 the audio data along with the information about the characteristic of the voice call that impacts the audio quality that was sent by the MGW 26. Assume for the sake of this example that audio data loss or any other data transmission factors occurring over the link 28 are disregarded. The audio quality manager 36 processes the information and computes performance control information at 48 that is sent to the control entity 50. In this example, the performance control information indicates that measures are to be taken to reduce the audio quality degradation over the air interface 12. The degree to which the audio quality degradation is to be limited is a factor of the audio quality loss incurred upstream of the RNC 30. The audio quality manager 36 can be provided with a table that determines on the basis of the audio quality degradation reported, the degree of corrective action required. In the present case, audio quality degradation is susceptible to occur over the air interface 12 as a result of loss of audio data. This loss can be limited by increasing the amount of power used to transmit the audio data over the air interface. This approach is particularly well suited for spread spectrum transmissions. In one specific example, the degree of power increase is correlated to the degree with which the audio quality of the voice call has been degraded over the section of the communication path upstream the RNC 30. In other words, the higher the audio quality degradation, the higher the power of transmission of the audio data will be.

Note that the increase of the power of transmission is in fact a relative increase to the power of transmission used to carry other voice calls handled by the RNC 30. So, instead of performing an increase of power level an equivalent approach would be to reduce the power level of other voice calls. Objectively, this approach may not be optimal since such power reduction may negatively impact the other voice calls. In the present specification the expression "relative power" is intended to cover both cases described here where the power of the audio data and the power of other data being transmitted is varied one with relation to the other.

The examples 1 to 4 illustrate how the audio quality of the voice call is managed at each node of the communications path on one direction of the call. The same process is repeated in the other direction, starting from the RNC 30 that determines the audio quality degradation over the air interface 12 and reports it to the MGW 26, and so on. The various nodes take corrective action, if required such as to limit the audio quality that is experienced by the user at mobile 18.

Example 5

Examples 1 to 4 discussed the instance where the various network nodes dynamically implement corrective action on the basis of real time audio quality impairment observed upstream of the node. Another possibility that is simpler to implement is to use communication path topology information to decide the network performance to be enforced at one or more of the network nodes. The communication path topology is determined at or shortly after the voice call is set-up, or at any time a topology change happens (e.g. due to handover in a wireless network). At this point all or most of the network nodes that will be carrying audio data are known; hence the communication path topology can be determined. It is also generally known that certain topologies are more prone to audio data loss and/or delay than others. For instance, communication path topologies that include an air interface are likely to induce a higher degree of audio quality loss and delay than topologies free of air interfaces. Similarly, it can be reasonably assumed that the higher the number of air interfaces, the higher the delay and the degree of audio quality impairment. Another element of the communication path that can induce significant audio quality degradation is the presence of a packet network such as the sub network 24. Accordingly, the link types and nodes involved in the communication path determine to some degree the inherent delay and audio quality loss that will be incurred. Therefore, by knowing the call topology certain network settings can be made to compensate for the inherent audio quality loss degradation. For instance, topologies that are inherently more susceptible to audio quality loss can be "improved" by setting certain performance requirements to a higher level. In this fashion, the network can maintain a more consistent audio quality over different communication path topologies.

The controlling entity that is responsible for call set-up would in most cases be the source of the information about the call topology. This information can be communicated to the relevant network entities through in band exchange of information. This controlling entity may be any one of the nodes shown in FIG. 1 or an external entity that instructs the network nodes to handle the voice call. Once this controlling entity has determined how the call will be set-up and derived a corresponding communication path topology, that information is sent to each node of the communication path. In the example of FIG. 1 the information is sent to the RNC 16, the MGW 22, the MGW 26 and the RNC 30. Alternatively, the information on the communication path topology can be sent only to selected nodes over which the communication path is established. The selected nodes are those nodes that can provide the most effective audio quality compensation. The information on the communication path topology can be sent via in-band signaling or as part of the signaling information to set up the communication path.

Therefore, the selected nodes receive at input 34 information conveying a characteristic of the voice call which in this case is information on the topology of the communication path over which the voice call is set up. The information on the topology of the communication path can be very detailed, such as spell all the network nodes and links involved or only in summary form indicating the presence and number of links or other network elements that are likely to impair the audio quality in a significant manner. For example, the topology information may indicate the presence or absence of air interfaces, and if air interfaces are present then the number of air interfaces present. Another possibility is to also indicate if packet sub-networks are present. Furthermore the information on topology does not need to be explicitly provided but can be derived from other information. For instance, an indication that a Tandem-Free-Operation is being established can be used as an indication that the call topology involves a mobile-to-mobile call.

Figure 4:
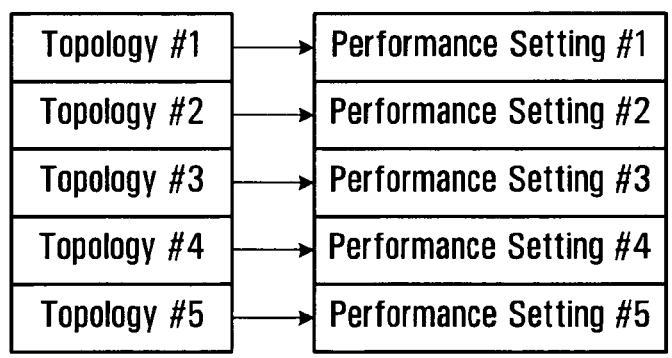
FIG. 4 is a depiction of a data structure mapping communication path topologies to performance settings.

The audio quality manager 36 receives the communication path topology information and consults a map stored in the memory 42, of the type shown in FIG. 4. The map correlates different communication path topologies with different performance settings. The audio quality manager 36 then searches the first column of the map to identify the specific topology configuration that is being reported and when the entry with that configuration is located, the corresponding performance setting extracted and produced at 48 as performance control information.

In a specific example, consider the RNC 30. Here the information on the communication path topology that is presented at input 34 indicates that the communication path includes a single air interface without any packet sub-network. The audio quality manager 36 will locate this configuration in the map shown at FIG. 4 and identify the corresponding performance setting, which in the case of the RNC 30 is the relative power level to be used to transmit the audio data to the mobile 32.

It should be expressly noted that this process is dynamic in the sense that adjustments are made in the initial stages of a voice call and also in the course of the call if the call topology changes, such as for example when the call is handed from one base station to another in a cellular environment.

In a different situation, the communication path topology that is presented at input 34 indicates that the communication path includes a single air interface and a packet sub-network, similar to the communication path shown at FIG. 2. The audio quality manager 36 locates this configuration in the map and implements a different performance setting. Here, the new performance setting is likely to involve a transmission at a relative higher power setting since the topology of the communication path is inherently more susceptible to audio quality loss than in the first case.

In a yet different situation, the communication path topology is presented at input 34, indicating that the communication path includes a pair of air interfaces and a packet sub-network. The performance setting implemented will be one where the audio data is transmitted at an even higher relative power to compensate for the audio quality loss incurred over this communication path topology.

The above examples of implementation were done in the context of voice communications but the same or similar principles can also be used in the context of video transmission.

Another possible variation of the invention is to implement a centralized management entity that can provide performance control information to one or to more than one network nodes that are remotely located. For instance, the audio quality manager 36 shown in FIG. 3 can be located remotely from the network node and communicate to the network node in any appropriate fashion the performance control information such that if any corrective action is required it can be implemented by the local control entity 50. Such centralized audio quality manager 36 can provide services to one node or to multiple nodes and issue performance control information to each node it controls.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A media signal quality manager for controlling a network node through which passes data traffic, wherein the data traffic conveys a media signal, said media signal quality manager comprising:
  a) an input for receiving information conveying a characteristic of the media signal that is usable to indicate degradation of quality of the media signal;
  b) a processor responsive to the information conveying the characteristic of the media signal that is usable to indicate degradation of quality of the media signal to generate performance control information, wherein the information conveying the characteristic of the media signal that is usable to indicate degradation of quality of the media signal conveys information about a topology of a communication path over which the media signal is transported, wherein the communication path includes the network node, and wherein the information conveying a characteristic of the media signal that is usable to indicate degradation of quality of the media signal conveys information indicating that the communication path includes an air interface; and c) an output for releasing the performance control information to the network node for allowing at least one parameter of the media signal to be adjusted by the network node at a point downstream from where the media signal is received at the network node to influence the quality of the media signal as perceived by a user.

2. A media signal quality manager as defined in claim 1, wherein said media signal quality manager is implemented physically within the network node.

3. A media signal quality manager as defined in claim 1, wherein said media signal quality manager is implemented remotely from the network node.

4. A media signal quality manager for controlling a network node through which passes data traffic, wherein the data traffic conveys a media signal, said media signal quality manager comprising:

a) an input for receiving information conveying a characteristic of the media signal that is usable to indicate degradation of quality of the media signal;

b) a processor responsive to the information conveying the characteristic of the media signal that is usable to indicate degradation of quality of the media signal to generate performance control information, wherein the information conveying the characteristic of the media signal that is usable to indicate degradation of quality of the media signal conveys information about a topology of a communication path over which the media signal is transported, wherein the communication path includes the network node, and wherein the information conveying a characteristic of the media signal that is usable to indicate degradation of quality of the media signal conveys information indicating that the communication path includes a packet sub-network; and c) an output for releasing the performance control information to the network node for allowing at least one parameter of the media signal to be adjusted by the network node at a point downstream from where the media signal is received at the network node to influence the quality of the media signal as perceived by a user.

5. A media signal quality manager as defined in claim 1, wherein the information conveying the characteristic of the media signal that is usable to indicate degradation of quality of the media signal conveys information about delay induced in the media signal.

6. A media signal quality manager as defined in claim 1, wherein the information conveying the characteristic of the media signal that is usable to indicate degradation of quality of the media signal conveys information about loss of media signal data.

7. A network node for passing data traffic conveying audio information associated with a voice call, the voice call established over a communication path in a network and including two or more network links, said network node located at a junction between an inbound link and an outbound link of the communication path and comprising:

a) an input for receiving the data traffic including the audio information from the inbound link;

b) an output for releasing the data traffic including the audio information over the outbound link of the communication path;

c) an audio quality manager responsive to information conveying a characteristic of the voice call that is usable to indicate degradation of audio quality of the audio information over the inbound link to generate performance control information, for use in adjusting at least one parameter of the voice call over the outbound link to influence the audio quality of the voice call, wherein the characteristic of the voice call that is usable to indicate degradation of audio quality of the audio information conveys information about a topology of the communication path, and wherein the characteristic of the voice call that is usable to indicate degradation of audio quality of the audio information conveys information indicating that the communication path includes an air interface.

8. A network node as defined in claim 7, wherein the information conveying the characteristic of the voice call that is usable to indicate degradation of audio quality of the audio information is received via said input.

9. A network node as defined in claim 7, wherein said audio quality manager processes the audio information associated with the voice call to generate the information conveying the characteristic of the voice call that is usable to indicate degradation of audio quality of the audio information.

10. A network node as defined in claim 7, including a control entity responsive to the performance control information to alter at least one transmission parameter of the voice call over the outbound link susceptible to increase the audio quality of the voice call.

11. A network node for passing data traffic conveying audio information associated with a voice call, the voice call established over a communication path in the network and including two or more network links, said network node located at a junction between an inbound link and an outbound link of the communication path and comprising:

a) an input for receiving the data traffic including the audio information from the inbound link;

b) an output for releasing the data traffic including the audio information over the outbound link of the communication path;

c) an audio quality manager responsive to information conveying a characteristic of the voice call that is usable to indicate degradation of audio quality of the audio information over the inbound link to generate performance control information, for use in adjusting at least one parameter of the voice call over the outbound link to influence the audio quality of the voice call, wherein the characteristic of the voice call that is usable to indicate degradation of audio quality of the audio information conveys information about a topology of the communication path, and wherein the characteristic of the voice call that is usable to indicate degradation of audio quality of the audio information conveys information indicating that the communication path includes a packet sub-network.

12. A network node as defined in claim 7, wherein the characteristic of the voice call that is usable to indicate degradation of audio quality of the audio information conveys information indicating that the communication path includes two or more air interfaces.

13. A network node as defined in claim 7, wherein the characteristic of the voice call that is usable to indicate degradation of audio quality of the audio information conveys information about loss of audio data over the communication path upstream of the network node.

14. A network node as defined in claim 7, wherein the audio information associated with the voice call is transported on the communication path in packets, and wherein the characteristic of the voice call that is usable to indicate degradation of audio quality of the audio information conveys information about loss of packets.

15. A network node as defined in claim 7, wherein the characteristic of the voice call that is usable to indicate degradation of audio quality of the audio information conveys information about delay induced in the audio information associated with the voice call over the communication path.

16. A network node as defined in claim 13, wherein said control entity is responsive to the information about loss of audio data to adjust a parameter of the voice call to reduce a likelihood of audio data loss over the outbound link of the communication path.

17. A network node as defined in claim 16, wherein the outbound link includes an air interface, the parameter of the voice call being a relative transmission power of the audio data over the air interface, and wherein said control entity is responsive to the information about loss of audio data to cause an increase of the relative transmission power to reduce a likelihood of audio data loss over the air interface.

18. A network node as defined in claim 17, wherein audio data is transmitted over the air interface by using a spread spectrum transmission.

19. A network node as defined in claim 15, wherein said control entity is responsive to the information about delay to control transmission delay of audio data over the outbound link to reduce a degradation of audio quality.

20. A network node as defined in claim 8, wherein the information conveying the characteristic of the voice call that is usable to indicate degradation of audio quality of the audio information is embedded in the voice call.

21. A network node as defined in claim 20, wherein the information conveying the characteristic of the voice call that is usable to indicate degradation of audio quality of the audio information is embedded in the voice call via in-band signaling.

22. A network node as defined in claim 8, wherein the information conveying the characteristic of the voice call that is usable to indicate degradation of audio quality of the audio information is sent to the network node separately from the audio information associated with the voice call.

23. A network node as defined in claim 7, wherein the network node includes a media gateway.

24. A network node as defined in claim 7, wherein the network node includes a radio network controller.

25. A communications network including the network node of claim 7.

26. A method for managing call quality in a network node passing data traffic conveying audio information associated with a voice call, the voice call established over a communication path in the network and including two or more network links, the network node located at a junction between an inbound link and an outbound link of the communication path, said method comprising:
  a) the network node receiving at an input the data traffic from the inbound link;
  b) the network node generating performance control information on the basis of at least one characteristic of the voice call over the inbound link that is usable to indicate a degradation of audio quality of the audio information, wherein the at least one characteristic of the voice call that is usable to indicate degradation of audio quality of the audio information conveys information about a topology of the communication path, and wherein the at least one characteristic of the voice call that is usable to indicate degradation of audio quality of the audio information conveys information indicating that the communication path includes an air interface;
  c) the network node adjusting at least one parameter of the voice call at least in part on the basis of the performance control information to reduce degradation of audio quality as audio information is transmitted over the outbound link;
  d) the network node releasing an output data traffic including the audio information over the outbound link.

27. A method as defined in claim 26, including the network node receiving information conveying the at least one characteristic of the voice call that is usable to indicate degradation of audio quality of the audio information at the input.

28. A method as defined in claim 26, including the network node processing the audio information associated with the voice call to generate information conveying the at least one characteristic of the voice call.

29. A method as defined in claim 26, wherein said adjusting includes altering at least one transmission parameter of the voice call over the outbound link.

30. A method for managing call quality in a network node passing data traffic conveying audio information associated with a voice call, the voice call established over a communication path in the network and including two or more network links, the network node located at a junction between an inbound link and an outbound link of the communication path, said method comprising:
  a) the network node receiving at an input the data traffic from the inbound link;
  b) the network node generating performance control information on the basis of at least one characteristic of the voice call over the inbound link that is usable to indicate a degradation of audio quality of the audio information;
  c) the network node adjusting at least one parameter of the voice call at least in part on the basis of the performance control information to reduce degradation of audio quality as audio information is transmitted over the outbound link;
  d) the network node releasing from an output data traffic including the audio information over the outbound link, wherein the at least one characteristic of the voice call that is usable to indicate degradation of audio quality of the audio information conveys information about a topology of the communication path, and wherein the at least one characteristic of the voice call that is usable to indicate degradation of audio quality of the audio information conveys information indicating that the communication path includes a packet sub-network.

31. A method as defined in claim 26, wherein the at least one characteristic of the voice call that is usable to indicate degradation of audio quality of the audio information conveys information indicating that the communication path includes two or more air interfaces.

32. A method as defined in claim 26, wherein the at least one characteristic of the voice call that is usable to indicate degradation of audio quality of the audio information conveys information about loss of audio data, over the communication path upstream of the network node.

33. A method as defined in claim 32, wherein the audio information associated with the voice call is transported on the communication path in packets, and wherein the at least one characteristic of the voice call that is usable to indicate degradation of audio quality of the audio information conveys information about loss of packets.

34. A method as defined in claim 26, wherein the at least one characteristic of the voice call that is usable to indicate degradation of audio quality of the audio information conveys information about delay induced in the audio information associated with the voice call over the communication path.

35. A method as defined in claim 32, wherein said adjusting reduces a likelihood of audio data loss over the outbound link of the communication.

36. A method as defined in claim 35, wherein the outbound link includes an air interface, the parameter of the voice call being a relative transmission power of the audio data over the air interface, and wherein said adjusting including causing an increase of the relative transmission power to reduce a likelihood of audio data loss over the air interface.

37. A method as defined in claim 36, including the network node transmitting the audio data over the air interface by using a spread spectrum transmission.

38. A method as defined in claim 34, wherein adjusting includes controlling transmission delay of audio data over the outbound link to reduce a degradation of audio quality.

39. A method for managing service quality in a communications network, the communications network including a plurality of nodes, said method comprising:
 a) the communications network setting up a voice call over a communication path in said network spanning a plurality of nodes;
 b) an audio quality manager communicatively coupled to a certain node adjusting a network performance parameter affecting an audio quality of the voice call over a portion of the communication path downstream the certain node on the basis of at least one characteristic of the voice call that is usable to indicate degradation of audio quality of the audio information over a portion of the communication path upstream the certain node, wherein the information conveying the characteristic of the media signal that is usable to indicate degradation of quality of the media signal conveys information about a topology of a communication path over which the media signal is transported wherein the communication path includes the network node and wherein the information conveying a characteristic of the media signal that is usable to indicate degradation of quality of the media signal conveys information indicating that the communication path includes an air interface.

40. A media signal quality manager for controlling a network node through which passes data traffic, wherein the data traffic conveys a media signal, said media signal quality manager comprising:
 a) input means for receiving information conveying a characteristic of the media signal that is usable to indicate a degradation of quality of the media signal;
 b) processor means responsive to the information conveying a characteristic of the media signal that is usable to indicate degradation of quality of the media signal to generate performance control information, wherein the information conveying the characteristic of the media signal that is usable to indicate degradation of quality of the media signal conveys information about a topology of a communication path over which the media signal is transported wherein the communication path includes the network node and wherein the information conveying a characteristic of the media signal that is usable to indicate degradation of quality of the media signal conveys information indicating that the communication path includes an air interface; and
 c) output means for releasing the performance control information to the network node for allowing at least one parameter of the media signal to be adjusted by the network node at a point downstream from where the media signal is received at the network node to influence the quality of the media signal as perceived by a user.

* * * * *